(12) United States Patent
Hart et al.

(10) Patent No.: US 12,169,069 B2
(45) Date of Patent: Dec. 17, 2024

(54) SYSTEM FOR PRODUCING DILUENT FOR A GAS TURBINE ENGINE

(71) Applicant: General Electric Company, Schenectady, NY (US)

(72) Inventors: Richard L. Hart, Broadalbin, NY (US); Seung-Hyuck Hong, Clifton Park, NY (US)

(73) Assignee: GENERAL ELECTRIC COMPANY, Evendale, OH (US)

(*) Notice: Subject to any disclaimer, the term of this patent is extended or adjusted under 35 U.S.C. 154(b) by 0 days.

(21) Appl. No.: 17/645,115

(22) Filed: Dec. 20, 2021

(65) Prior Publication Data

US 2023/0194097 A1    Jun. 22, 2023

(51) Int. Cl.
*F23R 3/40* (2006.01)
*F02C 3/22* (2006.01)
*F02C 7/232* (2006.01)

(52) U.S. Cl.
CPC .................. *F23R 3/40* (2013.01); *F02C 3/22* (2013.01); *F02C 7/232* (2013.01)

(58) Field of Classification Search
CPC .... F23R 3/40; F23R 3/286; F23R 3/36; F02C 3/28; F02C 7/224; F02C 3/20; F02C 3/22; F02C 3/24; F02C 3/30; F05D 2240/36; F05D 2260/212; F05D 2270/16; F23L 2900/00001; F02M 27/02; Y02E 60/50; Y02P 90/40; H01M 8/04111
See application file for complete search history.

(56) References Cited

U.S. PATENT DOCUMENTS

| | | |
|---|---|---|
| 5,881,549 A | 3/1999 | Janes |
| 6,269,625 B1 | 8/2001 | Dibble et al. |
| 7,117,674 B2 | 10/2006 | Sprouse et al. |
| 7,870,717 B2 | 1/2011 | MacKnight |
| 9,360,214 B2 | 6/2016 | Conchieri et al. |
| 9,464,573 B2 | 10/2016 | Remy et al. |
| 2008/0092513 A1* | 4/2008 | Carroni ............ B01F 25/31322 431/170 |
| 2011/0056184 A1* | 3/2011 | Sisco ........................ F23R 3/36 60/218 |
| 2012/0102967 A1* | 5/2012 | Kirzhner .................. F23R 3/36 60/773 |

(Continued)

FOREIGN PATENT DOCUMENTS

| | | |
|---|---|---|
| GB | 1475456 A | 6/1977 |
| KR | 101755887 B1 | 7/2017 |
| WO | 2001/20149 A1 | 3/2001 |

*Primary Examiner* — Ehud Gartenberg
*Assistant Examiner* — Jingchen Liu
(74) *Attorney, Agent, or Firm* — Venable LLP; David D. Leege; Michele V. Frank (57) ABSTRACT

A gas turbine engine including a catalytic reactor and a combustor. The catalytic reactor is configured (i) to receive hydrogen fuel, (ii) to receive air containing oxygen, (iii) to catalytically react at least a portion of the oxygen in the air with at least a portion of the hydrogen in the hydrogen fuel to produce water, and (iv) to output diluent comprising the catalytically produced water. The combustor includes (a) a combustion chamber and (b) at least one nozzle that is fluidly coupled to the catalytic reactor to receive the diluent output by the catalytic reactor and configured to inject the diluent into the combustion chamber.

20 Claims, 5 Drawing Sheets

(56) References Cited

U.S. PATENT DOCUMENTS

| | | | |
|---|---|---|---|
| 2015/0244007 A1* | 8/2015 | Nakamoto | H01M 8/04395 |
| | | | 429/446 |
| 2016/0126570 A1* | 5/2016 | Nagai | H01M 8/04432 |
| | | | 137/560 |
| 2021/0207540 A1* | 7/2021 | Roberge | F02C 7/22 |
| 2022/0099299 A1* | 3/2022 | Carrotte | F02C 7/143 |

* cited by examiner

SYSTEM FOR PRODUCING DILUENT FOR A GAS TURBINE ENGINE

TECHNICAL FIELD

Preferred embodiments described herein relate to systems for and methods of providing diluent to a gas turbine engine.

BACKGROUND

The propulsion system for commercial aircraft typically includes one or more aircraft engines, such as turbofan jet engines. The turbofan jet engine(s) may be mounted to a respective one of the wings of the aircraft, such as in a suspended position beneath the wing using a pylon. These engines may be powered by aviation turbine fuel, which is typically a combustible hydrocarbon liquid fuel, such as a kerosene-type fuel, having a desired carbon number. Such fuel produces carbon dioxide upon combustion, and improvements to reduce such carbon dioxide emissions in commercial aircraft are desired. A hydrogen fuel may be utilized to achieve improvements in the emissions from commercial aircraft.

BRIEF DESCRIPTION OF THE DRAWINGS

Features and advantages of the present disclosure will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As noted above, a hydrogen fuel may be utilized to achieve improvements in the emissions from commercial aircraft. Hydrogen fuel, however, poses a number of challenges as compared to combustible hydrocarbon liquid fuel, such as Jet-A fuel or natural gas (NG). Hydrogen fuel, for example, is a reactive fuel that burns at higher temperatures than combustible hydrocarbon liquid fuel. Nitrogen oxide ("NOx") emission increases exponentially with high diatomic hydrogen ($H_2$) content in fuel. When hydrogen fuel is used in current gas turbine engines with rich burn combustors, the higher combustion temperature requires additional water (or other diluent) additions to reduce the production of NOx, as compared to combustible hydrocarbon liquid fuel. Hydrogen fuel also has much higher flame speeds, which could impose an operability issue for combustors designed for Jet-A or NG fuel. For example, each of Jet-A fuel and NG may have a flame speed of about one meter per second, but a hydrogen fuel of diatomic hydrogen has a flame of about ten meters per second (see the comparison shown in FIG. 4). The high flame speed of hydrogen makes it difficult to start up the engine with only hydrogen fuel due to potential risks of flashback or flameholding, imposing a safety issue. Therefore, combustor swirlers or premixers designed for conventional Jet-A or NG fuels must either be re-designed to stabilize hydrogen fueled flames, or an alternative fuel or diluent should be used to address the operability issue.

Utilizing hydrogen fuel in a gas turbine engine may require the use of large amounts of diluents, such as water. The use of diluents requires storage tanks to store the diluent and also requires the associated systems to introduce the diluent into the combustor and/or the hydrogen fuel, thus increasing the complexity and space requirements for a gas turbine engine using hydrogen fuel as compared to a gas turbine engine using a combustible hydrocarbon liquid fuel. These space requirements can be a particular disadvantage when using hydrogen fuel for applications such as aircraft, where space and weight are at a premium. The present disclosure discusses systems and methods that can be used to produce diluent from a combination of hydrogen fuel and air, reducing, or even eliminating, the need to store diluent onboard the aircraft using the gas turbine engine. In addition, this method of producing diluent enables starting-up a gas turbine engine with one hundred percent hydrogen fuel, which is used for power generation, and eliminates the need of an alternative fuel for start-up. In one embodiment, the present disclosure uses a catalytic reactor for a catalytic reaction between the oxygen in the air and hydrogen in the hydrogen fuel to produce water. This catalytically produced water can be used as the diluent. In addition, nitrogen can be used as a diluent and the nitrogen in the air used for the catalytic reaction is also used as a diluent.

Figure 1:
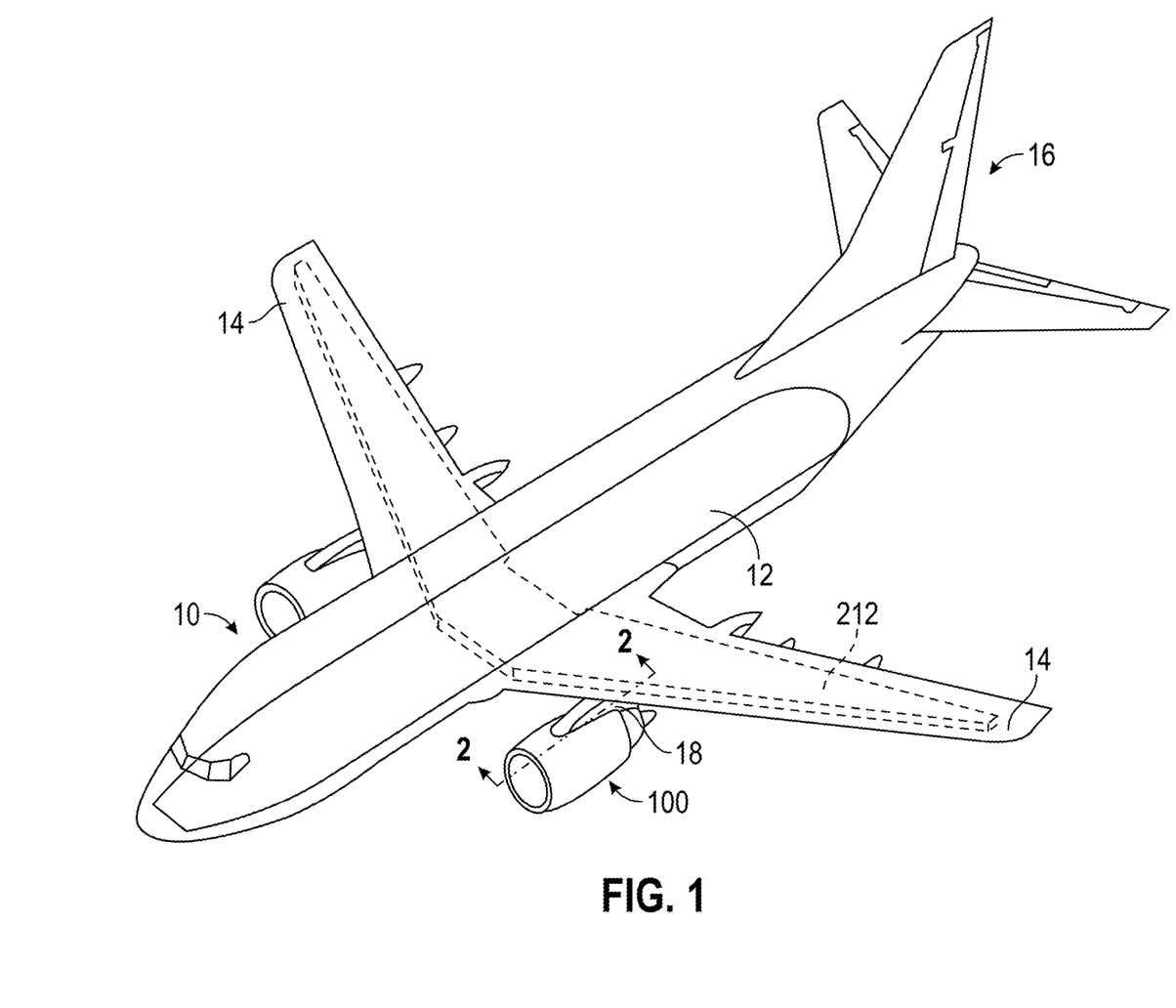
FIG. 1 is a schematic perspective view of an aircraft having a gas turbine engine according to an embodiment of the present disclosure.

A particular example of suitable applications for producing diluent from the air and hydrogen fuel is in gas turbine engines used on aircraft, as the diluent storage systems can be reduced or limited, freeing up space and reducing the weight of the engine components. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 200. The fuel is stored in a fuel tank 212 of the fuel system 200. As shown in FIG. 1, at least a portion of the fuel tank 212 is located in each wing 14 and a portion of the fuel tank 212 is located in the fuselage 12 between the wings 14. The fuel tank 212, however, may be located at other suitable locations in the fuselage 12 or the wing 14. The fuel tank 212 may also be located entirely within the fuselage 12 or the wing 14. The fuel tank 212 may also be separate tanks instead of a single, unitary body, such as, for example, two tanks each located within a corresponding wing 14.

Although the aircraft 10 shown in FIG. 1 is an airplane, the embodiments described herein may also be applicable to other aircraft 10, including, for example, helicopters and unmanned aerial vehicles (UAV). The aircraft discussed herein are fixed-wing aircraft or rotor aircraft that generate lift by aerodynamic forces acting on, for example, a fixed wing (e.g., wing 14) or a rotary wing (e.g., rotor of a helicopter), and are heavier-than-air aircraft, as opposed to lighter-than-air aircraft (such as a dirigible). The engine 100 may be used in various other applications including stationary power generation systems and other vehicles beyond the aircraft 10 explicitly described herein, such as boats, ships, cars, trucks, and the like. The engines described herein are gas turbine engines, but the embodiments described herein also may be applicable to other engines where hydrogen is used as a fuel.

For the embodiment depicted, the engine 100 is a high bypass turbofan engine. The engine 100 may also be referred to as a turbofan engine 100 herein. FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

Figure 2:
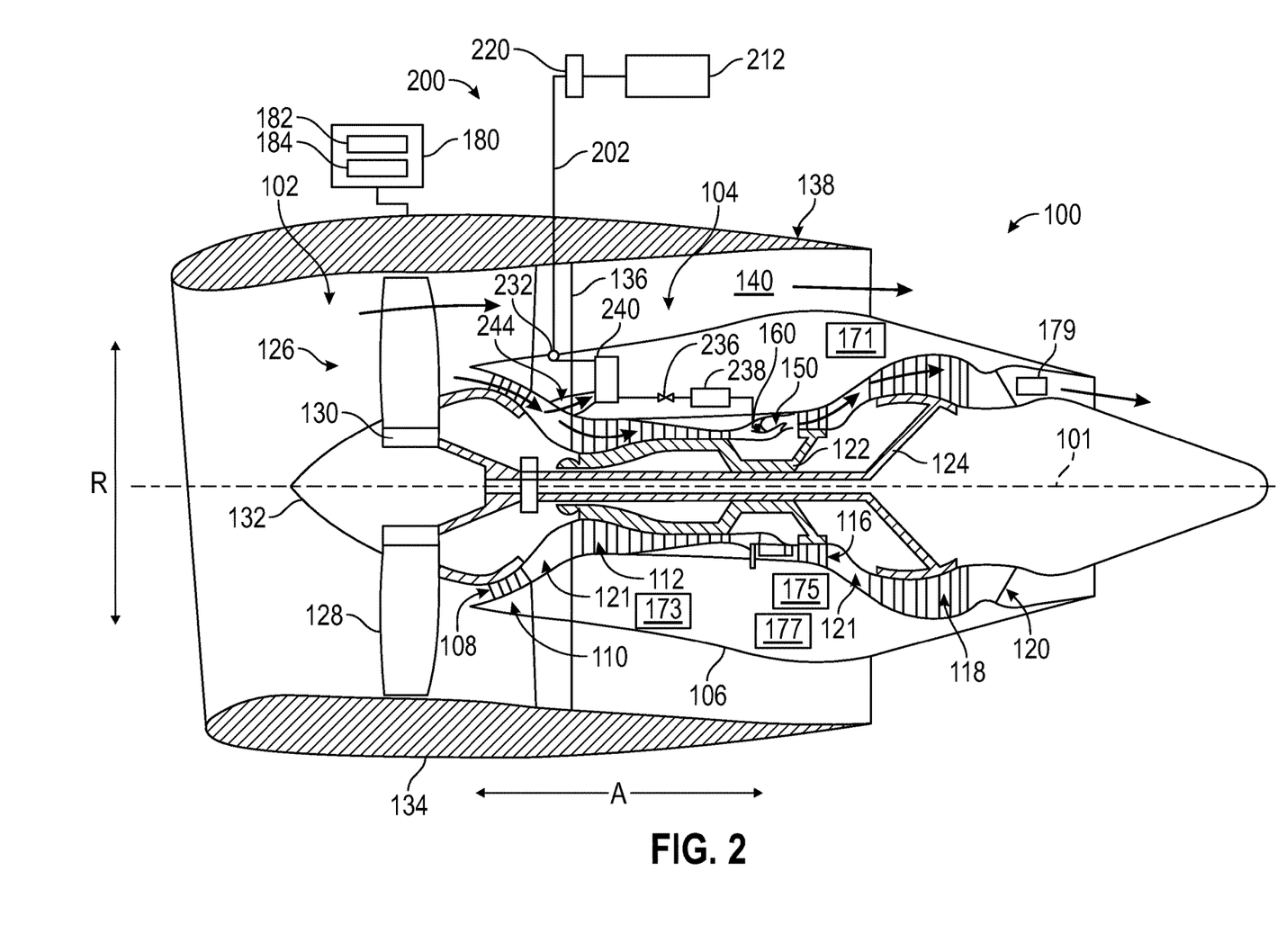
FIG. 2 is a schematic, cross-sectional view, taken along line 2-2 in FIG. 1, of the gas turbine engine of the aircraft shown in FIG. 1.

The turbomachine 104 depicted in FIG. 2 includes a tubular outer casing 106 that defines an annular inlet 108. The outer casing 106 encases, in a serial flow relationship, a compressor section including a booster or low-pressure (LP) compressor 110 and a high-pressure (HP) compressor 112, a combustion section (also referred to herein as a combustor 150), a turbine section including a high-pressure (HP) turbine 116 and a low-pressure (LP) turbine 118, and a jet exhaust nozzle section 120. The compressor section, the combustor 150, and the turbine section together define at least in part a core air flowpath 121 extending from the annular inlet 108 to the jet exhaust nozzle section 120. The turbofan engine 100 further includes one or more drive shafts. More specifically, the turbofan engine includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130 in a spaced-apart manner. The fan blades 128 and the disk 130 are rotatable, together, about the longitudinal centerline (axis) 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 212 to the engine 100, and, more specifically to a plurality of fuel nozzles 162 that inject fuel into a combustion chamber 152 of the combustor 150.

The turbofan engine 100 also includes various accessory systems to aid in the operation of the turbofan engine 100 and/or an aircraft including the turbofan engine 100. For example, the turbofan engine 100 may include a main lubrication system 171, a compressor cooling air (CCA) system 173, an active thermal clearance control (ATCC) system 175, and a generator lubrication system 177, each of which is depicted schematically in FIG. 2. The main lubrication system 171 is configured to provide a lubricant to, for example, various bearings and gear meshes in the compressor section, the turbine section, the HP spool 122, and the LP shaft 124. The lubricant provided by the main lubrication system 171 may increase the useful life of such components and may remove a certain amount of heat from such components. The compressor cooling air (CCA) system 173 provides air from one or both of the HP compressor 112 or LP compressor 110 to one or both of the HP turbine 116 or LP turbine 118. The active thermal clearance control (ATCC) system 175 cools a casing of the turbine section to maintain a clearance between the various turbine rotor blades and the turbine casing within a desired range throughout various engine operating conditions. The generator lubrication system 177 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100.

Heat from these accessory systems 171, 173, 175, and 177, and other accessory systems, may be provided to various heat sinks as waste heat from the turbofan engine 100 during operation, such as to various vaporizers 220, as discussed below. Additionally, the turbofan engine 100 may include one or more heat exchangers 179 within, for example, the turbine section or jet exhaust nozzle section 120 for extracting waste heat from an airflow therethrough to also provide heat to various heat sinks, such as the vaporizers 220, discussed below.

The turbofan engine 100 discussed herein is, however provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, and the like. In such a manner, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines or gas turbine engines with annular- can or can combustors for power generation applications. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 171, 173, 175, and 177, discussed above.

The engine 100 may include an engine controller 180, schematically shown in FIG. 2, configured to control various systems of the engine 100. The engine controller 180 may also be communicatively coupled to other controllers of the aircraft 10. Such controllers may include, for example, a controller that is part of the flight control system for the aircraft 10, such as a flight controller.

In this embodiment, the engine controller 180 is a computing device having one or more processors 182 and one or more memories 184. The processor 182 can be any suitable processing device, including, but not limited to a microprocessor, a microcontroller, an integrated circuit, a logic device, a programmable logic controller (PLC), an application specific integrated circuit (ASIC), and/or a Field Programmable Gate Array (FPGA). The memory 184 can include one or more computer-readable media, including, but not limited to non-transitory computer-readable media, a computer readable non-volatile medium (e.g., a flash memory), a RAM, a ROM, hard drives, flash drives, and/or other memory devices.

The memory 184 can store information accessible by the processor 182, including computer-readable instructions that can be executed by the processor 182. The instructions can be any set of instructions or a sequence of instructions that, when executed by the processor 182, cause the processor 182 and the engine controller 180 to perform operations. In some embodiments, the instructions can be executed by the processor 182 to cause the processor 182 to complete any of the operations and functions for which the engine controller 180 is configured, as will be described further below. The instructions can be software written in any suitable programming language or can be implemented in hardware. Additionally, and/or alternatively, the instructions can be executed in logically and/or virtually separate threads on the processor 182. The memory 184 can further store data that can be accessed by the processor 182.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
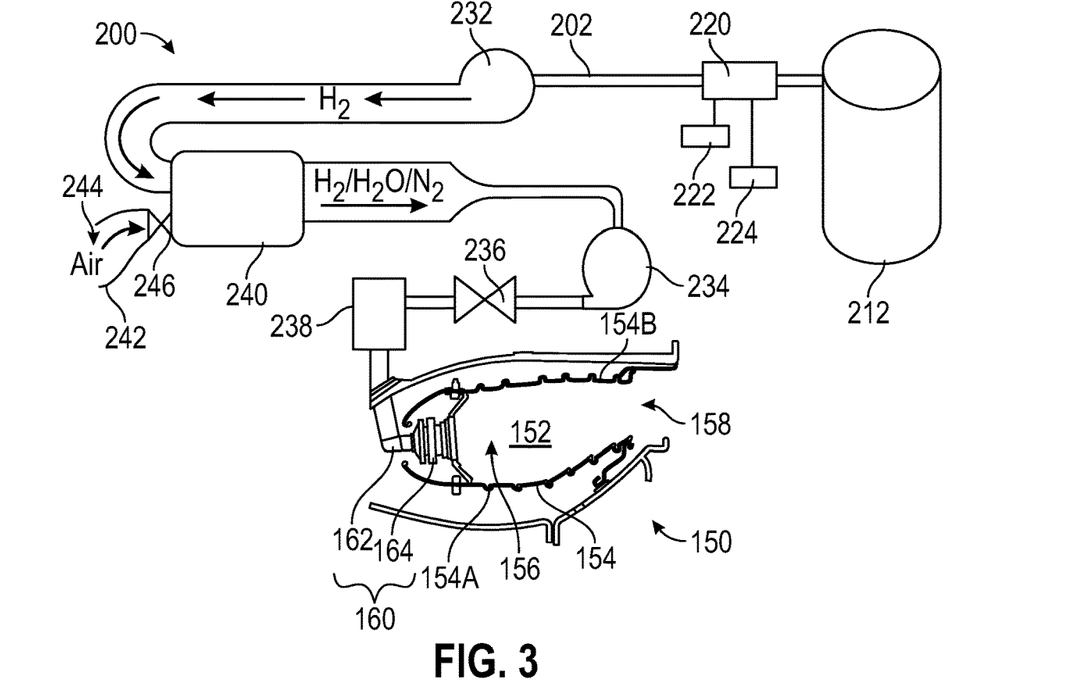
FIG. 3 is a schematic view of a fuel system and combustor according to an embodiment of the present disclosure.

FIG. 3 is a schematic view of the fuel system 200 according to an embodiment of the present disclosure. The fuel system 200 of this embodiment is configured to store the fuel for the engine 100 (FIGS. 1 and 2) in the fuel tank 212 and to deliver the fuel to the engine 100 via the fuel delivery assembly 202. The fuel delivery assembly 202 includes tubes, pipes, and the like, to fluidly connect the various components of the fuel system 200 to the engine 100. As discussed above, the engine 100, and in particular the combustor 150 discussed herein may be particularly suited for use with hydrogen fuel (diatomic hydrogen) or, in other embodiments, hydrogen enriched fuels. In the embodiments shown in FIG. 2, the fuel is a hydrogen fuel comprising hydrogen, more specifically, diatomic hydrogen. In some embodiments, the hydrogen fuel may consist essentially of hydrogen.

The fuel tank 212 may be configured to hold the hydrogen fuel at least partially in the liquid phase and may be configured to provide hydrogen fuel to the fuel delivery assembly 202 substantially completely in the liquid phase, such as completely in the liquid phase. For example, the fuel tank 212 may have a fixed volume and contain a volume of the hydrogen fuel in the liquid phase (liquid hydrogen fuel). As the fuel tank 212 provides hydrogen fuel to the fuel delivery assembly 202 substantially completely in the liquid phase, the volume of the liquid hydrogen fuel in the fuel tank 212 decreases and the remaining volume in the fuel tank 212 is made up by, for example, hydrogen in the gaseous phase (gaseous hydrogen). As used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 212 at very low (cryogenic) temperatures. For example, the hydrogen fuel may be stored in the fuel tank 212 at about −253 degrees Celsius or less at atmospheric pressure, or at other temperatures and pressures to maintain the hydrogen fuel substantially in the liquid phase. The fuel tank 212 may be made from known materials such as titanium, Inconel®, aluminum, or composite materials. The fuel tank 212 and the fuel system 200 may include a variety of supporting structures and components to facilitate storing the hydrogen fuel in such a manner.

The liquid hydrogen fuel is supplied from the fuel tank 212 to the fuel delivery assembly 202. The fuel delivery assembly 202 may include one or more lines, conduits, etc., configured to carry the hydrogen fuel between the fuel tank 212 and the engine 100. The fuel delivery assembly 202 thus provides a flow path of the hydrogen fuel from the fuel tank 212 to the engine 100. The hydrogen fuel is delivered to the engine by the fuel delivery assembly 202 in the gaseous phase, the supercritical phase, or both (at least one of the gaseous phase and the supercritical phase). The fuel system 200 thus includes a vaporizer 220 in fluid communication with the fuel delivery assembly 202 to heat the liquid hydrogen fuel flowing through the fuel delivery assembly 202. The vaporizer 220 is positioned in the flow path of the hydrogen fuel between the fuel tank 212 and the engine 100. The vaporizer 220 may be positioned at least partially within the fuselage 12 or the wing 14, such as at least partially within the wing 14. The vaporizer 220 may, however, be positioned at other suitable locations in the flow path of the hydrogen between the fuel tank 212 and the engine 100. For example, the vaporizer 220 may be positioned external to the fuselage 12 and the wing 14 and positioned at least partially within the pylon 18 or the engine 100. When positioned in the engine 100, the vaporizer may be located in the nacelle 134, for example. Although only one vaporizer 220 is shown in FIG. 2, the fuel system 200 may include multiple vaporizers 220. For example, when a vaporizer 220 is positioned in the engine 100 or in the pylon 18 and functions as a primary vaporizer configured to operate once the engine 100 is in a thermally stable condition, another vaporizer 220 is positioned upstream of the primary vaporizer and proximate to the fuel tank 212 and functions as a primer vaporizer during start-up (or prior to start-up) of the engine 100.

The vaporizer 220 is in thermal communication with at least one heat source 222, 224. In this embodiment, the vaporizer 220 is in thermal communication with a primary heat source 222 and an auxiliary heat source 224. In this embodiment, primary heat source 222 is waste heat from the engine 100, and the vaporizer 220 is, thus, thermally connected to at least one of the main lubrication system 171, the compressor cooling air (CCA) system 173, the active thermal clearance control (ATCC) system 175, the generator lubrication system 177, and the heat exchangers 179 to extract waste heat from the engine 100 to heat the hydrogen fuel. In such a manner, the vaporizer 220 is configured to operate by drawing heat from the primary heat source 222 once the engine 100 is capable of providing enough heat, via the auxiliary heat source 224, to the vaporizer 220, in order to facilitate operation of the vaporizer 220.

The vaporizer 220 may be heated by any suitable heat source, and, in this embodiment, for example, the auxiliary heat source 224 is a heat source external to the engine 100. The auxiliary heat source 224 may include, for example, an electrical power source, a catalytic heater or burner, and/or a bleed airflow from an auxiliary power unit. The auxiliary heat source 224 may be integral to the vaporizer 220, such as when the vaporizer 220 includes one or more electrical resistance heaters, or the like, that are powered by the electrical power source. In this configuration the auxiliary heat source 224 may provide heat for the vaporizer 220 independent of whether or not the engine 100 is running and can be used, for example, during start-up (or prior to start-up) of the engine 100.

As noted, the vaporizer 220 is in communication with the flow of the hydrogen fuel through the fuel delivery assembly 202. The vaporizer 220 is configured to draw heat from at least one of the primary heat source 222 and the auxiliary heat source 224 to heat the flow of hydrogen fuel from a substantially completely liquid phase to a substantially completely gaseous phase or to a substantially completely supercritical phase.

The fuel system 200 also includes a high-pressure pump 232 in fluid communication with the fuel delivery assembly 202 to induce the flow of the hydrogen fuel through the fuel delivery assembly 202 to the engine 100. The high-pressure pump 232 may generally be the primary source of pressure rise in the fuel delivery assembly 202 between the fuel tank 212 and the engine 100. The high-pressure pump 232 may be configured to increase a pressure in the fuel delivery assembly 202 to a pressure greater than a pressure within the combustion chamber 152 of the combustor 150 of the engine 100, and to overcome any pressure drop of the components placed downstream of the high-pressure pump 232.

The high-pressure pump 232 is positioned within the flow of hydrogen fuel in the fuel delivery assembly 202 at a location downstream of the vaporizer 220. In this embodiment, the high-pressure pump 232 is positioned external to the fuselage 12 and the wing 14, and is positioned at least partially within the pylon 18, or at least partially within the engine 100. More specifically, the high-pressure pump 232 is positioned within the engine 100. With the high-pressure pump 232 located in such a position, the high-pressure pump 232 may be any suitable pump configured to receive the flow of hydrogen fuel in substantially completely a gaseous phase or a supercritical phase. In other embodiments, however, the high-pressure pump 232 may be positioned at other suitable locations, including other positions within the flow path of the hydrogen fuel. For example, the high-pressure pump 232 may be located upstream of the vaporizer 220 and may be configured to receive the flow of hydrogen fuel through the fuel delivery assembly 202 in a substantially completely liquid phase.

As noted above, a diluent may be injected with the hydrogen fuel into the combustion chamber 152. In this embodiment, diluent is produced using the hydrogen fuel, and, in some embodiments, diluent is not separately stored on the aircraft 10, but rather, only produced as discussed herein. The fuel system 200 includes a catalytic reactor 240 that is used to produce the diluent. The catalytic reactor 240 is fluidly connected to the fuel delivery assembly 202. In this embodiment, the catalytic reactor 240 is positioned in the flow path of the hydrogen fuel between the fuel tank 212 and the engine 100 downstream of the high-pressure pump 232 and upstream of a fuel metering valve 236 (discussed further below). The fuel delivery assembly 202 is configured to provide the catalytic reactor 240, and the catalytic reactor 240 is configured to receive hydrogen fuel. In this embodiment, the catalytic reactor 240 is positioned external to the fuselage 12 and the wing 14, and is positioned at least partially within the pylon 18, or at least partially within the engine 100. More specifically, the catalytic reactor 240 is positioned within the engine 100. In other embodiments, however, the catalytic reactor 240 may be positioned at other suitable locations, including other positions within the flow path of the hydrogen fuel.

The catalytic reactor 240 also includes an inlet 242, through which air can be introduced to the catalytic reactor 240. The catalytic reactor 240 is, thus, also configured to receive or draw air from an air source. The air source may be any suitable air source. In this embodiment, the air source is air flowing around or through the engine 100. As shown in FIG. 2, for example, the air is a portion of the air flowing through the core air flowpath 121. More specifically, in this embodiment, the air is compressed air drawn from the compressor section or a position after the compressor section. In FIG. 2, a port 244 is located downstream of the low-pressure (LP) compressor 110 and upstream of the high-pressure (HP) compressor 112, and a portion of air compressed by the low-pressure (LP) compressor 110 is directed into the port 244 to be used in the catalytic reactor 240. The location of the port 244 is illustrative and other suitable locations for the port 244 may be used. For example, the port 244 may be positioned in the core air flowpath 121 downstream of the high-pressure (HP) compressor 112 and upstream of the combustor 150. The port 244 may also be positioned to receive air that has been compressed (or accelerated) by the fan section 102, such as either in the bypass airflow passage 140 to receive bypass air or in the annular inlet 108. Other suitable air sources include, for example, a back-up air supply for the engine 100 or even a dedicated port drawing air from outside the engine 100.

The air and the hydrogen fuel are mixed in the catalytic reactor 240, as schematically illustrated in FIG. 3. The air includes (or contains) oxygen, more specifically, diatomic oxygen ($O_2$), and the hydrogen fuel includes hydrogen, more specifically, diatomic hydrogen ($H_2$). The catalytic reactor 240 also includes a catalyst such that when oxygen in the air mixes with hydrogen in the air, the oxygen and hydrogen undergo a catalytic reaction to produce water ($H_2O$). The catalytic reactor 240 may include any catalyst suitable to promote the reaction between the oxygen and hydrogen to produce water. For example, the catalyst may be a metal catalyst and/or a ceramic catalyst. Metal catalysts may include, for example, at least one of the platinum group metals such as ruthenium, rhodium, palladium, osmium, iridium, and platinum. In addition, or in the alternative, the ceramic catalyst may include, for example, at least one transition metal oxide (e.g. Ni, Fe, Co). As another example of ceramic catalysts, a complex ceramic oxide catalyst based on perovskite or doped rare-earth oxides may be employed. The chemistry of ceramic based catalysts also can be a rich titanate oxide having, for example, the formula $AXO_3$, where A is one of Ca, Ba, Sr, Cd, La, Pr, Gd, Sm, Y, or Nd and X is one of Fe, Mn, Cr, Al, Ti, Mn, or Nb. Other suitable catalysts may include copper cobaltite, lanthanum cobaltite, lanthanum ferrite, lanthanum manganite, and the like.

To promote the catalytic reaction, the catalytic reactor 240 preferably operates at an elevated temperature, such as from two hundred degrees Celsius to one thousand degrees Celsius. The catalytic reaction is exothermic and, thus, the elevated temperature is maintained during normal operation. During start up (or prior to start-up), the catalyst (catalytic reactor 240) may be heated by a heat source to raise the temperature to the desired elevated temperature. Suitable heat sources include, for example, a glow plug, an electrical power source, and/or a bleed airflow from an auxiliary power unit, to obtain the temperature in the catalytic reactor 240 initially.

The catalytic reactor 240 is configured to catalytically react at least a portion of the oxygen in the air with at least a portion of the hydrogen in the hydrogen fuel to produce water. At least a portion of the oxygen in the air reacts with hydrogen in the hydrogen fuel to produce water. In some embodiments, the oxygen in the air is substantially completely reacted with hydrogen in the hydrogen fuel. As used herein, the term "substantially completely", as used to describe the amount of a particular element or molecule, refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. The water produced by the catalytic reaction of oxygen with hydrogen in the catalytic reactor 240 is referred to herein as catalytically produced water. The catalytically produced water is used as a diluent, and the catalytic reactor 240 is configured to output diluent comprising the catalytically produced water.

Figure 4:
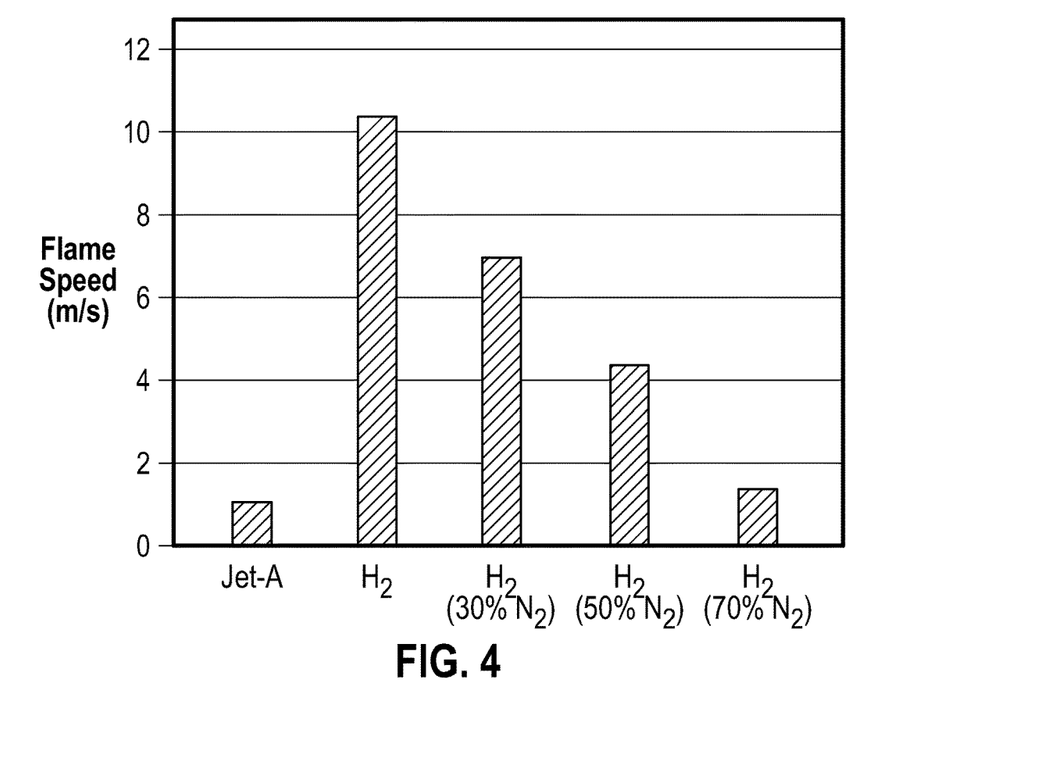
FIG. 4 is a bar chart showing flame speed in meters per second for different fuels and fuel diluent mixtures.

The air also includes (or contains) nitrogen, more specifically, diatomic nitrogen ($N_2$) and other minor constituents (e.g., Ar and $CO_2$). It has been found that nitrogen can be used as a diluent with hydrogen fuel. FIG. 4 is a bar chart showing flame speed in meters per second for different fuels and fuel diluent mixtures. As shown in FIG. 4, hydrogen fuel that consists essentially of diatomic hydrogen has a flame speed of about ten meters per second. Mixing the hydrogen with a percentage (by mass) of diatomic nitrogen can reduce the flame speed, such as to about seven meters per second for 30% nitrogen (and 70% hydrogen), to about four meters per second for 50% nitrogen (and 50% hydrogen), and to about one and a half meters per second for 70% nitrogen (and 30% hydrogen). The nitrogen in the air may also be used as a diluent in the fuel. The nitrogen is received by the catalytic reactor 240, but, in this embodiment, does not undergo any reactions. The catalytic reactor 240 is configured to output diluent comprising the nitrogen, more specifically, diatomic nitrogen ($N_2$). In this embodiment, the nitrogen from the air is mixed with the catalytically produced water and the catalytic reactor 240 is configured to output diluent comprising nitrogen from the air and the catalytically produced water.

As shown in FIG. 3, the combustor 150 is fluidly coupled to the fuel delivery assembly 202 and the fuel tank 212 via the catalytic reactor 240 and, thus, receives hydrogen fuel via the catalytic reactor 240. In this embodiment, only a portion of the hydrogen is reacted with the oxygen from the air in the catalytic reactor 240, and the catalytic reactor 240 is configured to output hydrogen (hydrogen fuel) as well as the diluent. The diluent and hydrogen fuel are mixed in the catalytic reactor 240 to form a fuel and diluent mixture.

As noted above, only a portion of the hydrogen received by the catalytic reactor 240 is reacted with the oxygen in this embodiment. The amount of oxygen in the reactor thus controls the amount of water produced, and the amount of oxygen is controlled by the amount of air provided to the catalytic reactor 240, or received by the catalytic reactor 240. In addition, controlling the amount of air also controls the amount of nitrogen that can be used as a diluent.

Figure 5:
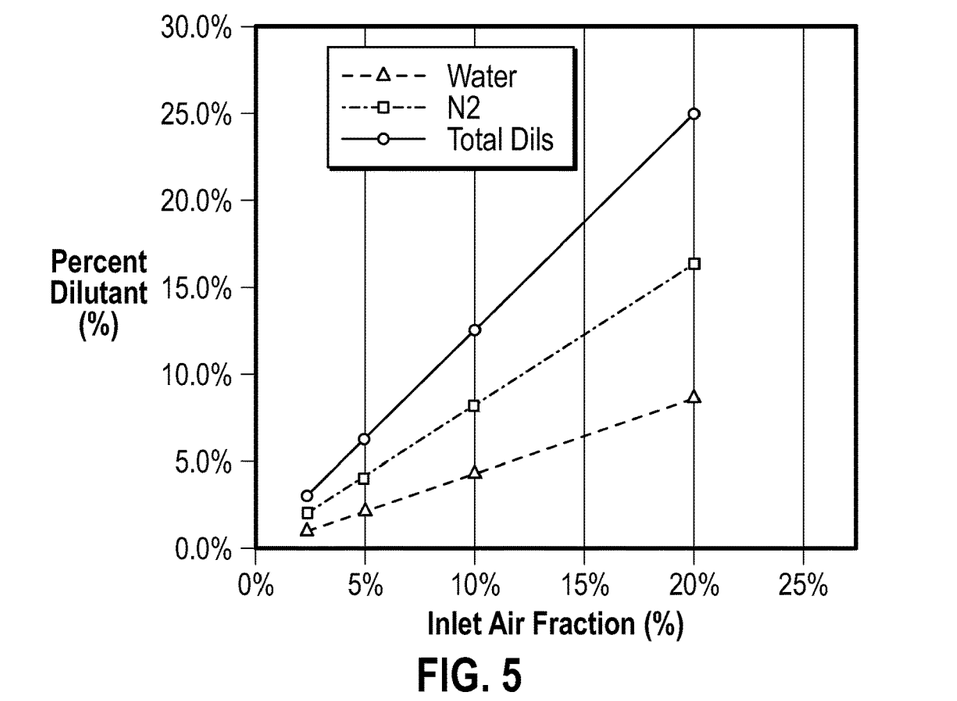
FIG. 5 is a line graph illustrating the percentage of diluent produced as a function of inlet air fraction for a catalytic reactor of the fuel system shown in FIG. 3.

FIG. 5 is a line graph illustrating the percentage of diluent in the fuel and diluent mixture as a function of inlet air fraction. The inlet air fraction is the amount of air to total amount of air and hydrogen fuel introduced to the catalytic reactor 240 at a given time (the mole percentage of air at the inlet of the catalytic reactor 240). As can be seen from FIG. 5, increasing the inlet air fraction increases the amount of diluent produced.

Changing the amount of diluent may be desirable based on the operating condition of the engine 100. For example, during start-up or other operating conditions such as taxiing when the flow rate of air through the combustion chamber 152 is relatively low, the amount of diluent can be a relatively high inlet air fraction to reduce the flame speed of the hydrogen fuel (see, e.g., FIG. 4). For the engine operating condition when the aircraft 10 is cruising, however, the air speed flowing through the combustion chamber 152 is relatively high and, thus, the amount of diluent is a relatively low inlet air fraction, allowing the flame speed to be fast. Controlling the amount of diluent in this way also helps to avoid problems such as lean blowout of the flame, which can occur when the flame speed is too low relative to the air flow speed, and flashback, which can occur when the flame speed is too high relative to the air flow speed.

Any suitable device may be used to control the amount of air provided to the catalytic reactor 240 and received by the catalytic reactor 240. In this embodiment, an air control valve 246 is fluidly coupled to the catalytic reactor to control the amount of air received by the catalytic reactor 240. Any suitable valve may be used for air control, such as a throttle valve, a damper, and the like. The air control valve 246 is schematically shown after the port 244 and in the inlet 242 of the catalytic reactor 240, but the air control valve 246 may be located at other suitable positions such as at the port 244. The engine controller 180 may be configured to control the air control valve 246 based, for example, on the operating condition of the engine 100 and/or aircraft 10, as discussed above.

The catalytic reactor 240 may have a relatively large pressure drop. As shown in FIG. 3, the fuel delivery assembly 202 may also include a booster pump 234, in some embodiments, to further induce the flow of the hydrogen fuel through the fuel delivery assembly 202 to the engine 100, and, more specifically, to the components in the flow path of the fuel and diluent mixture that are downstream of the catalytic reactor 240. The booster pump 234 may be positioned within the flow of the fuel and diluent mixture at a location downstream of the catalytic reactor 240. In this embodiment, the booster pump 234 is positioned upstream of the fuel metering valve 236.

The fuel system 200 also includes a metering unit in fluid communication with the fuel delivery assembly 202. Any suitable metering unit may be used including, for example, a fuel metering valve 236 placed in fluid communication with the fuel delivery assembly 202. The fuel delivery assembly 202 is configured to provide the fuel metering valve 236, and the fuel metering valve 236 is configured to receive hydrogen fuel. In this embodiment, the fuel metering valve 236 is fluidly coupled to the catalytic reactor 240 and positioned downstream of the catalytic reactor 240 and the booster pump 234, and the hydrogen fuel provided to, and received by, the fuel metering valve 236 is from the fuel and diluent mixture output from the catalytic reactor 240. The fuel metering valve 236 is further configured to provide the flow of the fuel and diluent mixture to the engine 100 in a desired manner. The fuel metering valve 236 is configured to provide a desired volume of the fuel and diluent mixture, at, for example, a desired flow rate, to a fuel manifold 238 of the engine 100. The fuel manifold 238 then distributes (provides) the hydrogen fuel received to a plurality of fuel nozzles 162 within the combustion section of the engine 100 where the hydrogen fuel is mixed with compressed air and the mixture of hydrogen fuel and compressed air is combusted to generate combustion gases that drive the engine 100. Adjusting the fuel metering valve 236 changes the volume of fuel (and diluent) provided to the combustion chamber 152 of the combustor 150 and, thus, changes the amount of propulsive thrust produced by the engine 100 to propel the aircraft 10.

FIG. 3 also shows the combustor 150 of the engine 100 according to an embodiment of the present disclosure. FIG. 3 is a cross-sectional view of the combustor 150. The combustor 150 includes a combustor liner 154. The combustor liner 154 of this embodiment has a combustor inner liner 154A and a combustor outer liner 154B. A combustion chamber 152 is formed within the combustor liner 154. The combustor liner 154, and, thus, also the combustion chamber 152, has a forward end 156 and an outlet 158. A fuel nozzle 162 is positioned at the forward end 156 of the combustion chamber 152. The fuel nozzle 162 of this embodiment is part of a swirler/fuel nozzle assembly 160. In this embodiment, the combustor 150 is an annular combustor 150 and a plurality of fuel nozzles 162 is arranged in an annular configuration with the plurality of fuel nozzles 162 (the swirler/fuel nozzle assemblies 160) aligned in a circumferential direction of the combustor.

As discussed above, the compressor section, the combustor 150, and the turbine section form, at least in part, the core air flowpath 121 extending from the annular inlet 108 to the jet exhaust nozzle section 120. Air entering through the annular inlet 108 is compressed by blades of a plurality of fans of the LP compressor 110 and HP compressor 112. A portion of the compressed air (primary air) enters the forward end 156 of the combustion chamber 152. Fuel is injected by the fuel nozzle 162 into the primary air and mixed with the primary air. As noted above, the fuel nozzle 162 of this embodiment is part of a swirler/fuel nozzle assembly 160. The swirler/fuel nozzle assembly 160 includes a swirler 164 that is used to generate turbulence in the primary air. The fuel nozzle 162 injects fuel into the turbulent airflow of the primary air and the turbulence promotes rapid mixing of the fuel with the primary air.

The mixture of fuel and compressed air is combusted in the combustion chamber 152, generating combustion gases (combustion products), which accelerate as the combustion gases leave the combustion chamber 152. The products of combustion are accelerated as the products are expelled through the outlet 158 to drive the engine 100. The primary air thus flows in a bulk airflow direction from the forward end 156 of the combustion chamber 152 to the outlet 158. The combusted fuel air mixture is then accelerated through the outlet 158 to turn the turbines (e.g., drive the turbine blades) of the HP turbine 116 and the LP turbine 118. As discussed above the HP turbine 116 and the LP turbine 118, among other things, drive the LP compressor 110 and HP compressor 112.

As noted above, the diluent is mixed with the hydrogen fuel as a fuel and diluent mixture. The fuel nozzle 162 injects the fuel and diluent mixture into the combustion chamber 152, and, in this embodiment, the diluent is injected into the forward end 156 of the combustion chamber 152 using the fuel nozzle 162.

Figure 6:
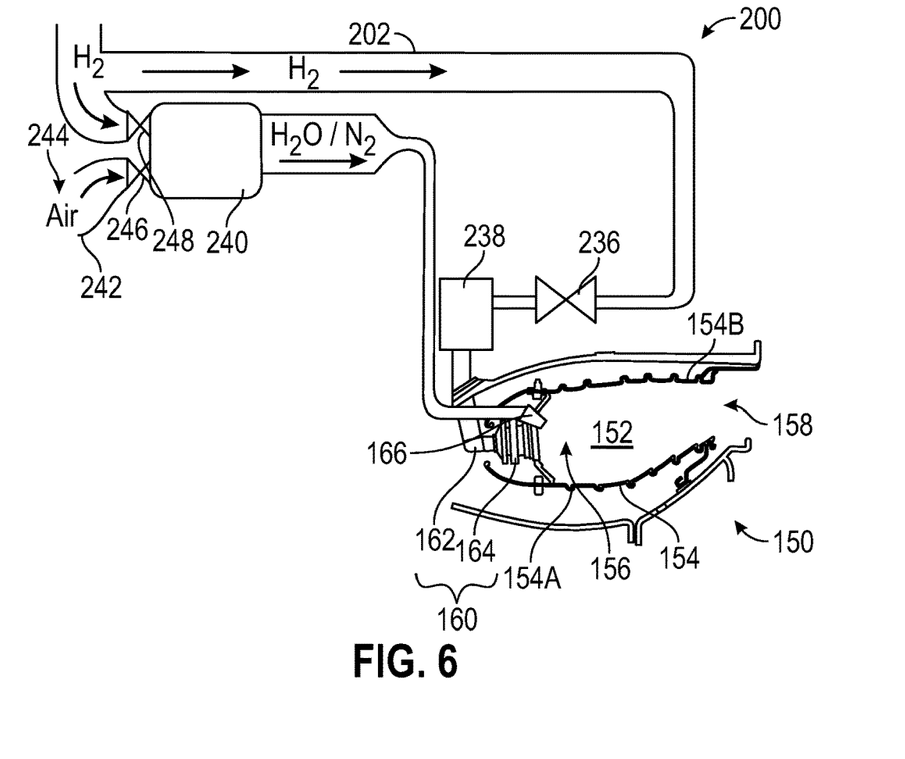
FIG. 6 is a schematic view of a fuel system and combustor according to an embodiment of the present disclosure.

FIG. 6 is a schematic view of the fuel system 200 and the combustor 150 according to another embodiment of the present disclosure. In the embodiment shown in FIG. 3, the fuel nozzle 162 is configured to inject both fuel and diluent into the combustion chamber 152, but other suitable configurations may be used, including, for example, separate fuel and diluent nozzles. Such a configuration is shown schematically in FIG. 6. The components that are the same or similar to the components described above with reference to FIG. 3 have the same reference numeral in FIG. 6, and a detailed description these components is omitted. The fuel nozzle 162 of the embodiment shown in FIG. 6 is configured to inject fuel into the combustion chamber 152. At least one separate nozzle, a diluent nozzle 166, is configured to inject diluent into the combustion chamber 152. In this embodiment, the catalytic reactor 240 is configured to produce diluent comprising nitrogen from the air and catalytically produced water. As in the embodiment discussed above, hydrogen from the hydrogen fuel is catalytically reacted with oxygen in the air to produce water, but the amount of hydrogen fuel supplied to the catalytic reactor 240 is controlled such that the output of the catalytic reactor 240 is substantially completely diluent. When the output is not completely diluent the remainder of the output may be hydrogen ($H_2$) from the hydrogen fuel or oxygen ($O_2$) from the air depending upon which of these two molecules is provided in excess (e.g., an amount greater than the sociometric amount).

Any suitable means may be used to control the amount of hydrogen fuel provided to, or received by, the catalytic reactor 240. In this embodiment, a hydrogen control valve 248 is fluidly coupled to the catalytic reactor 240 to control the amount of hydrogen received by the catalytic reactor 240. In FIG. 6, the hydrogen control valve 248 is shown schematically at the inlet to catalytic reactor 240, but the hydrogen control valve 248 may be located at other suitable positions. The engine controller 180 may be configured to control the hydrogen control valve 248 in addition to the air control valve 246 based, for example, on the operating condition of the engine 100 and/or aircraft 10, as discussed above.

The at least one diluent nozzle 166 is fluidly connected to the output of the catalytic reactor 240 and receives the output of the catalytic reactor 240, which, in this embodiment, is substantially completely diluent. The diluent nozzle 166 then injects diluent into the forward end 156 of the combustion chamber 152. In some embodiments, a plurality of diluent nozzles 166 may be used, and a plurality of diluent nozzles 166 may also be used for each fuel nozzle 162.

Figure 7:
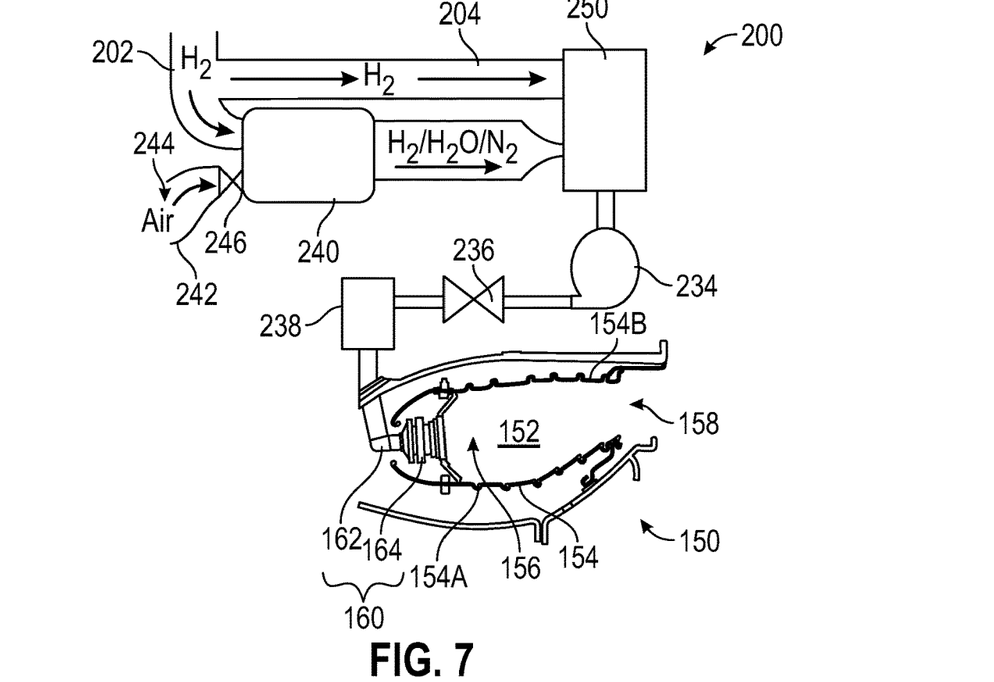
FIG. 7 is a schematic view of a fuel system and combustor according to an embodiment of the present disclosure.

FIG. 7 is a schematic view of the fuel system 200 and the combustor 150 according to another embodiment of the present disclosure. In some embodiments, it may be beneficial to reduce the amount of hydrogen fuel flowing through the catalytic reactor 240 and provide some of the hydrogen fuel to the combustor 150 through a flow path that does not include the catalytic reactor 240. Such a configuration is shown in FIG. 7. The components that are the same or similar to the components described above with reference to FIGS. 3 and 6 have the same reference numeral in FIG. 7, and a detailed description these components is omitted. In the configuration shown in FIG. 7, a portion of the hydrogen fuel flowing from the fuel tank 212 flows to the catalytic reactor 240 and the remaining portion bypasses the catalytic reactor 240 by flowing through a bypass flow path 204. The output of the catalytic reactor 240 and the portion of the hydrogen fuel that flows through the bypass flow path 204 may be mixed in a fuel mixing assembly 250 located upstream of the fuel metering valve 236. FIG. 7 shows the catalytic reactor 240 operating as described above with reference to FIG. 3, and the output of the catalytic reactor 240 contains hydrogen which may be used as fuel. Alternatively, the catalytic reactor 240 may be configured and controlled as described above with reference to FIG. 6 to output diluent.

In the embodiments discussed above, the gas turbine engine 100 and combustor 150 have been described as using hydrogen fuel. The systems and methods to produce diluent discussed herein may be applicable to other fuels as well.

Figure 8:
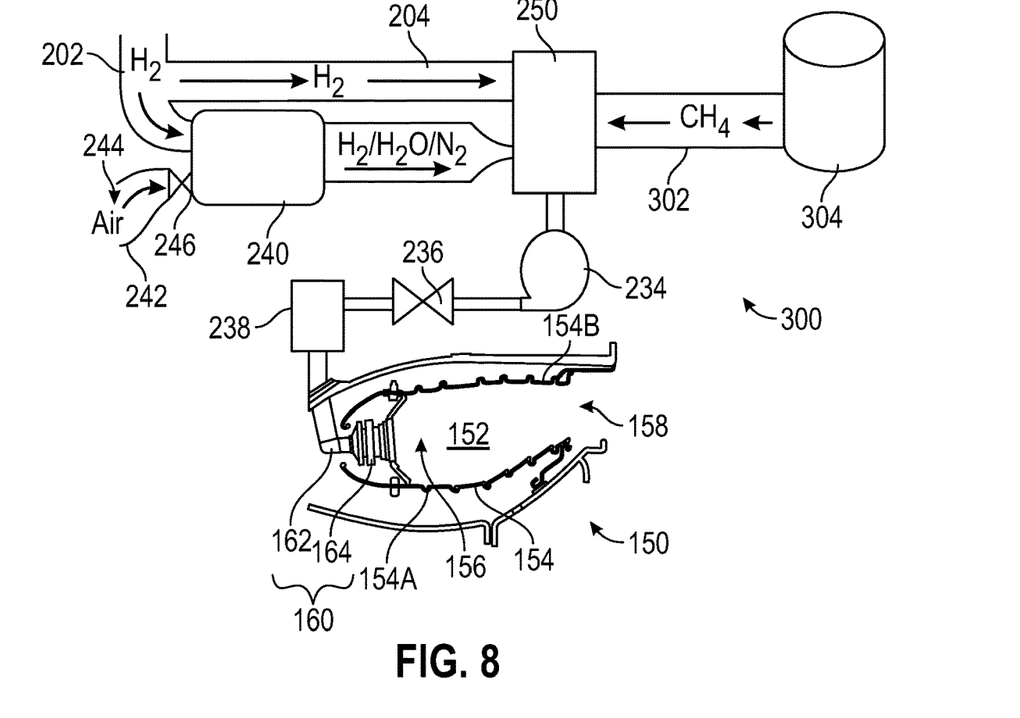
FIG. 8 is a schematic view of a fuel system and combustor according to an embodiment of the present disclosure.

FIG. 8 is a schematic view of a fuel system 300 that provides a hydrogen enriched fuel, such as hydrogen enriched natural gas ($CH_4$) to the combustor 150. The components that are the same or similar to the components described above with reference to FIGS. 3, 6, and 7 have the same reference numeral in FIG. 8, and a detailed description these components is omitted. In the fuel system 300 shown in FIG. 8, the fuel system 300 also includes a natural gas delivery assembly 302 that connects a source of natural gas (such as a natural gas storage tank 304) to the fuel mixing assembly 250 where the natural gas is mixed with the hydrogen and diluent produced by the catalytic reactor 240. In FIG. 8, the hydrogen and diluent are provided to the fuel mixing assembly 250 from the catalytic reactor 240 and the bypass flow path 204 in the manner described above with reference to FIG. 6 The hydrogen fuel and diluent, however, may be provided to the fuel mixing assembly 250 using the catalytic reactor 240 and the fuel delivery assembly 202 configured in the manner as shown in FIGS. 3 and 5.

Further aspects of the present disclosure are provided by the subject matter of the following clauses.

A gas turbine engine includes a catalytic reactor and a combustor. The catalytic reactor is configured (i) to receive hydrogen fuel, (ii) to receive air containing oxygen, (iii) to catalytically react at least a portion of the oxygen in the air with at least a portion of the hydrogen in the hydrogen fuel to produce water, and (iv) to output diluent comprising the catalytically produced water. The combustor includes (a) a combustion chamber and (b) at least one nozzle that is fluidly coupled to the catalytic reactor to receive the diluent output by the catalytic reactor and configured to inject the diluent into the combustion chamber.

The gas turbine engine of the preceding clause, wherein the air further contains nitrogen and the diluent comprises nitrogen from the air.

The gas turbine engine of any of the preceding clauses, further comprising a compressor section including a plurality of compressor fan blades configured to compress air flowing therethrough. The air received by the catalytic reactor is a portion of the compressed air.

The gas turbine engine of any of the preceding clauses, wherein the at least one nozzle of the combustor further includes a fuel nozzle configured to inject the hydrogen fuel into the combustion chamber.

The gas turbine engine of any of the preceding clauses, further comprising a fuel mixing assembly fluidly coupled to the catalytic reactor to receive the diluent output by the catalytic reactor. The fuel mixing assembly is configured (i) to receive natural gas, (ii) to receive hydrogen fuel, (iii) to mix the natural gas, the hydrogen fuel, and the diluent to produce a hydrogen enriched natural gas fuel and diluent mixture. The at least one nozzle is configured to inject the hydrogen enriched natural gas fuel and diluent mixture into the combustion chamber.

The gas turbine engine of any of the preceding clauses, further comprising an air control valve fluidly coupled to the catalytic reactor to control the amount of air received by the catalytic reactor.

The gas turbine engine of any of the preceding clauses, wherein the catalytic reactor is configured such that controlling the amount of air received by the catalytic reactor controls the amount of catalytically produced water.

The gas turbine engine of any of the preceding clauses, wherein the catalytic reactor is configured such that controlling the amount of air received by the catalytic reactor controls the amount of the diluent injected into the combustion chamber as a percentage of the hydrogen fuel injected into the combustion chamber.

The gas turbine engine of any of the preceding clauses, further comprising a controller configured to operate the air control valve.

The gas turbine engine of any of the preceding clauses, wherein the controller is configured to adjust the amount of air received by the catalytic reactor based on an operating condition of the gas turbine engine.

The gas turbine engine of any of the preceding clauses, further comprising a hydrogen control valve fluidly coupled to the catalytic reactor to control the amount of the hydrogen fuel received by the catalytic reactor.

The gas turbine engine of any of the preceding clauses, further comprising a controller configured to operate the hydrogen control valve.

The gas turbine engine of any of the preceding clauses, wherein the controller is configured to adjust the amount of hydrogen received by the catalytic reactor based on an operating condition of the gas turbine engine.

The gas turbine engine of any of the preceding clauses, wherein the at least one nozzle is configured to inject both the hydrogen fuel and the diluent into the combustion chamber.

The gas turbine engine of any of the preceding clauses, wherein the catalytic reactor is configured to catalytically react a portion of the hydrogen in the hydrogen fuel to produce water and further to output hydrogen fuel.

The gas turbine engine of any of the preceding clauses, further comprising a plurality of nozzles and a manifold fluidly coupled to the catalytic reactor and the plurality of nozzles to distribute the hydrogen fuel and the diluent to each nozzle of the plurality of nozzles.

The gas turbine engine of any of the preceding clauses, further comprising a hydrogen fuel delivery assembly configured to deliver the hydrogen fuel comprising hydrogen. The catalytic reactor fluidly is coupled to the hydrogen fuel delivery assembly to receive the hydrogen fuel from the hydrogen fuel delivery assembly.

The gas turbine engine of any of the preceding clauses, further comprising a hydrogen fuel tank and a vaporizer. The hydrogen fuel tank holds the hydrogen fuel in a liquid phase. The hydrogen fuel delivery assembly is connected to the hydrogen fuel tank. The vaporizer is in communication with the hydrogen fuel delivery assembly for heating the hydrogen fuel in the liquid phase to at least one of a gaseous phase and a supercritical phase. The vaporizer is located between the hydrogen fuel tank and the catalytic reactor.

An aircraft including a fuselage, a wing connected to the fuselage, and the gas turbine engine of any of the preceding clauses.

The aircraft of any of the preceding clauses, wherein the hydrogen fuel tank is positioned at least partially within at least one of the fuselage and the wing.

The aircraft of any of the preceding clauses, wherein the vaporizer is positioned at least partially within at least one of the fuselage, the wing, and the gas turbine engine.

A method of operating a gas turbine engine includes combining air containing oxygen with hydrogen fuel containing hydrogen in a catalytic reactor such that the oxygen in the air catalytically reacts with the hydrogen in the hydrogen fuel to produce water and outputting a diluent from the catalytic reactor. The diluent comprises the catalytically produced water. The method also includes injecting hydrogen fuel into a combustion chamber and injecting the diluent into the combustion chamber.

The method of the preceding clause, wherein the air further contains nitrogen and the diluent further comprises nitrogen from the air.

The method of any of the preceding clauses, further including compressing air with a plurality of compressor fan blades to form compressed air. The air combined with the hydrogen fuel in the catalytic reactor is a portion of the compressed air.

The method of any of the preceding clauses, further comprising mixing the diluent and hydrogen fuel to form a fuel and diluent mixture. The fuel and diluent mixture is injected into the combustion chamber.

The method of any of the preceding clauses, further including mixing the diluent and the hydrogen fuel in the catalytic reactor.

The method of any of the preceding clauses, further including mixing natural gas with the hydrogen fuel and the diluent to form the fuel and diluent mixture.

The method of any of the preceding clauses, wherein, when the air is combined with the hydrogen fuel in the catalytic reactor, the air has an inlet air fraction. The inlet air fraction is a ratio of the amount of air to total amount of air and hydrogen fuel introduced to the catalytic reactor at a given time.

The method of any of the preceding clauses further including mixing the diluent and hydrogen fuel to form a fuel and diluent mixture. The fuel and diluent mixture is injected into the combustion chamber. The method also includes controlling the amount of the diluent in the fuel and diluent mixture by controlling the inlet air fraction.

The method of any of the preceding clauses, further including controlling the inlet air fraction by controlling the amount of air mixed with the hydrogen fuel.

Although the foregoing description is directed to the preferred embodiments, it is noted that other variations and modifications will be apparent to those skilled in the art and may be made without departing from the spirit or scope of the disclosure. Moreover, features described in connection with one embodiment may be used in conjunction with other embodiments, even if not explicitly stated above.

We claim:

1. A gas turbine engine comprising:
   a catalytic reactor configured (i) to receive hydrogen fuel, (ii) to receive reaction air containing oxygen from a first airflow path, (iii) to mix the reaction air and the hydrogen fuel, (iv) to catalytically react at least a portion of the oxygen in the reaction air with a portion of the hydrogen in the hydrogen fuel to produce water, and (v) to output a hydrogen fuel and diluent mixture comprising an unreacted portion of the hydrogen in the hydrogen fuel and diluent, the diluent comprising the catalytically produced water; and
   a combustor including (a) a combustion chamber having a forward end configured to receive a primary air from a second airflow path and (b) at least one nozzle positioned at the forward end of the combustion chamber, the at least one nozzle fluidly coupled to the catalytic reactor to receive the hydrogen fuel and diluent mixture output by the catalytic reactor to inject the hydrogen fuel and diluent mixture into the combustion chamber; and
   a fuel metering valve positioned upstream of the at least one nozzle and downstream of the catalytic reactor relative to a flow of the hydrogen fuel and diluent mixture, the fuel metering valve operable to regulate the flow of the hydrogen fuel and diluent mixture to the at least one nozzle.

2. The gas turbine engine of claim 1, wherein the reaction air further contains nitrogen and the diluent comprises the nitrogen from the reaction air.

3. The gas turbine engine of claim 1, further comprising a compressor section including a plurality of compressor fan blades configured to provide a compressed air, wherein the reaction air received by the catalytic reactor is a portion of the compressed air.

4. The gas turbine engine of claim 1, further comprising a fuel mixing assembly fluidly coupled to the catalytic reactor to receive the hydrogen fuel and diluent mixture output by the catalytic reactor, the fuel mixing assembly being configured (i) to receive natural gas, (ii) to mix the natural gas with the hydrogen fuel and diluent mixture output from the catalytic reactor to produce a hydrogen enriched natural gas fuel and diluent mixture, (iii) to deliver the hydrogen enriched natural gas fuel and diluent mixture to the fuel metering valve, wherein the at least one nozzle is configured to inject the hydrogen enriched natural gas fuel and diluent mixture output from the fuel metering valve into in the combustion chamber.

5. The gas turbine engine of claim 1, further comprising an air control valve fluidly coupled to the catalytic reactor to control an amount of the reaction air received by the catalytic reactor from the first airflow path.

6. The gas turbine engine of claim 5, wherein the catalytic reactor is configured such that controlling the amount of the reaction air received by the catalytic reactor from the first airflow path controls an amount of the catalytically produced water.

7. The gas turbine engine of claim 5, wherein the catalytic reactor is configured such that controlling the amount of the reaction air received by the catalytic reactor from the first airflow path controls the amount of the diluent injected into the combustion chamber as a percentage of the hydrogen fuel and diluent mixture injected into the combustion chamber.

8. The gas turbine engine of claim 5, further comprising a controller configured to operate the air control valve.

9. The gas turbine engine of claim 8, wherein the controller is configured to adjust the amount of the reaction air received by the catalytic reactor from the first airflow path based on an operating condition of the gas turbine engine.

10. The gas turbine engine of claim 1, further comprising a hydrogen control valve fluidly coupled to the catalytic reactor to control an amount of the hydrogen fuel received by the catalytic reactor.

11. The gas turbine engine of claim 10, further comprising a controller configured to operate the hydrogen control valve.

12. The gas turbine engine of claim 11, wherein the controller is configured to adjust the amount of the hydrogen fuel received by the catalytic reactor based on an operating condition of the gas turbine engine.

13. The gas turbine engine of claim 1,
wherein the at least one nozzle comprising a plurality of nozzles; and a manifold fluidly coupled to the the fuel metering valve and each of the plurality of nozzles and configured to distribute the hydrogen fuel and diluent mixture to each of the plurality of nozzles.

14. The gas turbine engine of claim 1, further comprising a hydrogen fuel delivery assembly configured to deliver the hydrogen fuel to the catalytic reactor.

15. The gas turbine engine of claim 14, further comprising:
a hydrogen fuel tank for holding the hydrogen fuel in a liquid phase, the hydrogen fuel delivery assembly being connected to the hydrogen fuel tank; and a vaporizer in communication with the hydrogen fuel delivery assembly for heating the hydrogen fuel in the liquid phase to at least one of a gaseous phase and a supercritical phase, the vaporizer being located between the hydrogen fuel tank and the catalytic reactor.

16. An aircraft comprising: a fuselage; a wing connected to the fuselage; and the gas turbine engine of claim 15.

17. The aircraft of claim 16, wherein the hydrogen fuel tank is positioned at least partially within at least one of the fuselage and the wing, and
wherein the vaporizer is positioned at least partially within at least one of the fuselage, the wing, and the gas turbine engine.

18. A gas turbine engine comprising:
a fan section including a fan having a plurality of fan blades rotatable to accelerate air;
a bypass airflow passage defined downstream of the fan section to receive a first portion of the air accelerated by the fan section as bypass air;
a core air flow path defined downstream of the fan section to receive a second portion of the air accelerated by the fan section as core air;
a reaction air flow path including a port positioned to draw reaction air from the core air flow path;

a compressor section defining a first portion of the core air flow path, the compressor section including a plurality of compressor fan blades generating compressed air by compressing the core air, wherein the compressor section includes a low-pressure compressor and a high-pressure compressor positioned downstream of the low-pressure compressor relative to a flow of the core air in the core air flow path, the port being positioned between the low-pressure compressor and the high-pressure compressor to draw a first portion of the compressed air from the core air flow path as the reaction air;
a catalytic reactor configured (i) to receive hydrogen fuel, (ii) to receive the reaction air containing oxygen from the reaction air flow path, (iii) to mix the reaction air and the hydrogen fuel, (iv) to catalytically react at least a portion of the oxygen in the reaction air with a portion of the hydrogen in the hydrogen fuel to produce water, and (v) to output a hydrogen fuel and diluent mixture comprising an unreacted portion of the hydrogen in the hydrogen fuel and diluent, the diluent comprising the catalytically produced water;
a combustor defining a second portion of the core air flow path, the combustor including (a) a combustion chamber having a forward end configured to receive a primary air from the core air flow path, the primary air being a second portion of the compressed air, and (b) at least one nozzle positioned at the forward end of the combustion chamber, the at least one nozzle fluidly coupled to the catalytic reactor to receive the hydrogen fuel and diluent mixture output by the catalytic reactor and to inject the hydrogen fuel and diluent mixture into the primary air in the combustion chamber to generate a fuel and air mixture, the fuel and air mixture being combusted in the combustor to generate combustion gases; and
a turbine located downstream of the combustor and drivingly coupled to the fan, the turbine to receive the combustion gases and to rotate the fan.

19. The gas turbine engine of claim 18, wherein the combustor further includes a nozzle assembly, the nozzle assembly including the at least one nozzle and a swirler generating turbulence in the primary air.

20. A gas turbine engine comprising:
a fan section including a fan having a plurality of fan blades rotatable to accelerate air;
a bypass airflow passage defined downstream of the fan section to receive a first portion of the air accelerated by the fan section as bypass air;
a core air flow path defined downstream of the fan section to receive a second portion of the air accelerated by the fan section as core air;
a reaction air flow path including a port positioned to draw a portion of the bypass air from the bypass airflow passage as reaction air;
a catalytic reactor configured (i) to receive hydrogen fuel, (ii) to receive the reaction air containing oxygen from the reaction air flow path, (iii) to mix the reaction air and the hydrogen fuel, (iv) to catalytically react at least a portion of the oxygen in the reaction air with a portion of the hydrogen in the hydrogen fuel to produce water, and (v) to output a hydrogen fuel and diluent mixture comprising an unreacted portion of the hydrogen in the hydrogen fuel and diluent, the diluent comprising the catalytically produced water;
a combustor defining a portion of the core air flow path, the combustor including (a) a combustion chamber having a forward end configured to receive the core air from the core air flow path as primary air and (b) at least one nozzle positioned at the forward end of the combustion chamber, the at least one nozzle fluidly coupled to the catalytic reactor to receive the hydrogen fuel and diluent mixture output by the catalytic reactor to inject the hydrogen fuel and diluent mixture into the primary air in the combustion chamber to generate a fuel and air mixture, the fuel and air mixture being combusted in the combustor to generate combustion gases; and a turbine located downstream of the combustor and drivingly coupled to the fan, the turbine to receive the combustion gases and to rotate the fan.

\* \* \* \* \*